Apr. 10, 1923. 1,451,424
R. HEAD
MEANS FOR GRINDING OR PULVERIZING FOOD OR OTHER SUBSTANCES OF A SIMILAR NATURE
Filed Sept. 3, 1921
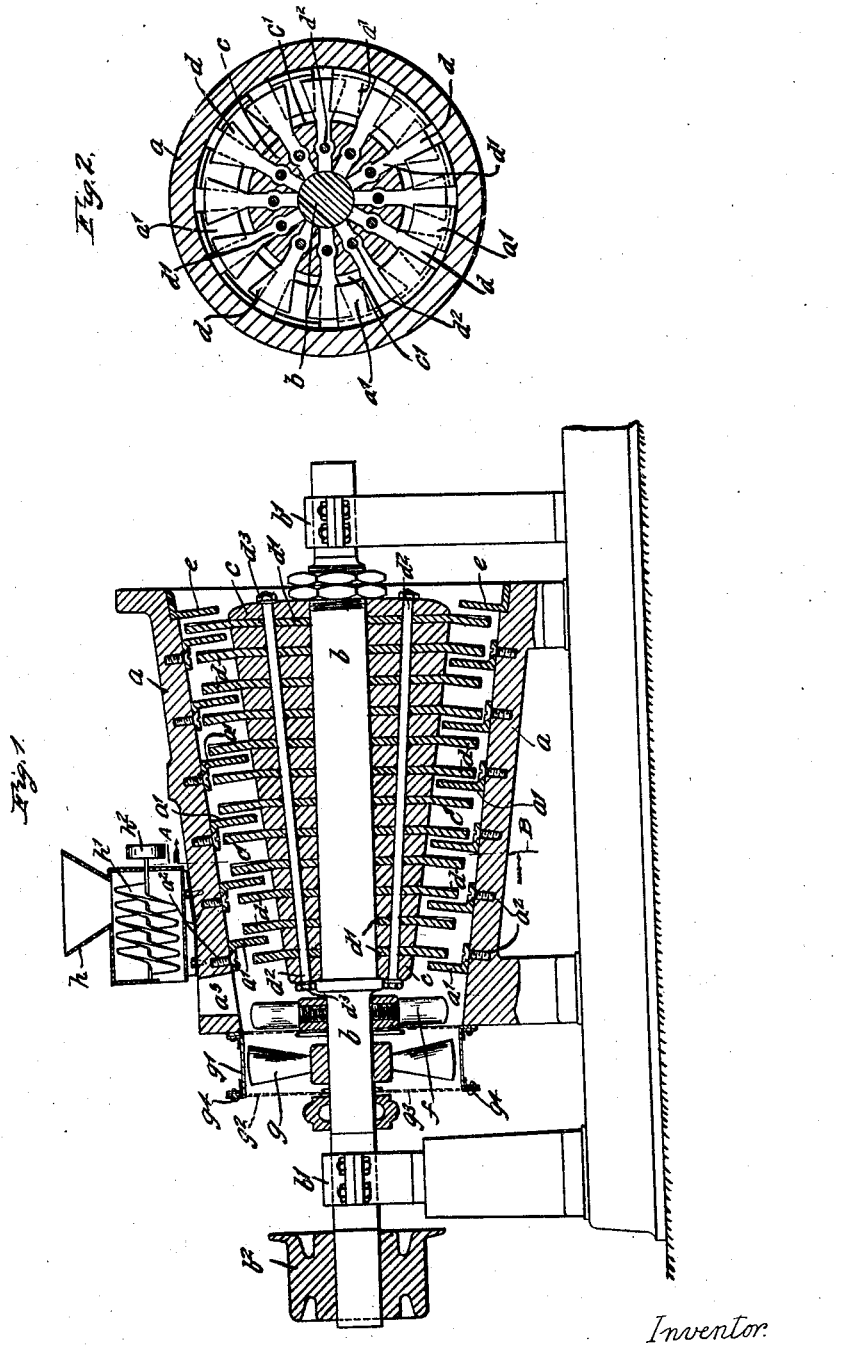
Inventor:
Ronald Head.
By his Attorney Patented Apr. 10, 1923.

1,451,424

UNITED STATES PATENT OFFICE.

RONALD HEAD, OF LUTON, ENGLAND, ASSIGNOR TO JOSEPH BAKER SONS AND PERKINS COMPANY, INCORPORATED, OF WHITE PLAINS, NEW YORK, A CORPORATION OF NEW YORK.

MEANS FOR GRINDING OR PULVERIZING FOOD OR OTHER SUBSTANCES OF A SIMILAR NATURE.

Application filed September 3, 1921. Serial No. 498,409.

*To all whom it may concern:*

Be it known that I, RONALD HEAD, of Luton, England, a subject of the King of England, have invented a certain new and useful Improved Means for Grinding or Pulverizing Food or Other Substances of a Similar Nature, for which I have filed application in England, 9th June, 1917, No. 153,332, and of which the following is a specification.

This invention relates to an improved method of and means for grinding or pulverizing food or other substances of a similar nature.

The object of the invention is the reduction of food, such as pressed cocoa cake for example, or other substances to a fine powder at high speed without generating heat, and without the consequent pasting up of the machine internally as obtains in the present methods and means when worked at high speed by reason of the oil or fat in the substance becoming liberated by said heat and clogging the machine.

The invention involves the use of a mill or the like including a stationary casing having interior reducers or beaters with a conical member therein, leaving an annular channel between itself and the casing, and provided with outer beaters or reducers cooperating with those of the casing. Such devices and others of a similar nature but not necessarily including separate cooperating beaters have been provided with means by which a current of air may be forced into or through the annular space to cool the material under treatment.

The improved method consists in feeding the material into a conical mill by the action of a screw or propeller which forces said material towards and into engagement with beaters or reducers within the mill, where at the same time it is subjected to a continuous current of air produced by a fan mounted coaxially with the moving member of the mill at the open end thereof, said air adapted to both cool or aerate the material during treatment and effect its passage through and ejectment from the mill.

The invention also comprises apparatus for carrying out said method involving novel combinations and arrangements of parts as hereinafter fully described and specifically pointed out in appended claims.

An embodiment of apparatus suitable for carrying out the invention is illustrated in the accompanying drawings wherein Fig. 1 is a longitudinal section, and Fig. 2 a cross section on the line A—B looking in the direction of the arrows.

The apparatus shown in the drawings consists of an open-ended stationary casing $a$ internally and externally coned as indicated and provided on its interior surface with beaters or reducers $a^1$ of varying length shown in the form of segments and fixed in any suitable manner as by screws $a^2$ to the interior surface and at suitable distances apart. Centrally and horizontally through the casing extends a shaft $b$ carried by suitable external bearings $b^1$ and driven as by means of a pulley $b^2$ upon which shaft is mounted a tapered cone $c$ leaving an annular space $c^1$ between the exterior of same and the inside of the casing, and on such cone are mounted beaters or reducers $d$ of varying length, said beaters or teeth engaging between the beaters or reducers $a^1$ on the inside of the casing. The cone may if desired be of different taper to the casing. The said beaters or reducers $d$ are shown as secured in the cone $c$ by means of elongated stems $d^1$ extending into slots in the cone and firmly secured by bolts $d^2$ extending from end to end of the cone and held by nuts $d^3$. At the delivery end, that is to say, the broad end of the cone, is secured a covering ring $e$ comprising segments very similar in form to the reducers $a^1$ and the outermost beaters $d$ cooperating therewith serve for the eduction or ejection of the material treated by other beaters during its passage through the annular space $c^1$.

At the feed end of the apparatus, viz:— the narrow end, of the casing, the shaft $b$ carries in front of the narrow end of the cone a screw or propeller $f$ which forces the material to be pulverized towards and into engagement with the beaters or reducers $a^1$ and $d$ respectively of both casing and cone, and in front of such screw or propeller and also on said shaft $b$ there is mounted an air fan or propeller $g$, shown as housed within a housing $g^1$ attached to the open feed end of the casing, said housing being preferably provided at the front end thereof, with grids or hit-and-miss, or other suitable devices for regulating the current of air, a preferred arrangement being doors or a pair of leaves $g^2$, $g^3$ hinged at one side of the housing, and which when closed cover the mouth of the housing and encircle the shaft, being at their other ends provided with pin and slot adjusting means $g^4$.

The substance to be pulverized is fed into the narrow end of the casing $a$ through aperture $a^3$ by suitable means, those shown including a hopper $h$ in which is rotatably mounted a feed worm $h^1$ capable of being driven through a pulley $h^2$. The material thus fed is then received by the feed screw $f$ and delivered by the latter to the annular space $c^1$ in which it is subjected to the pulverizing action of the beaters or reducers $a^1$ and $d$ and delivered at the discharge end by the current of air from the fan $g$, assisted by the action of the beaters $d$ and ring $e$. Any suitable receptacle (not shown) may receive the final product of the apparatus. For the purpose of introducing and amalgamating any flavours or colours with the material during pulverization an auxiliary feed inlet is provided when required, as will be readily understood.

From the above description it will be apparent that the method and apparatus of this invention provides for the efficient reduction of many kinds of material without undue generation of heat and further effects the very desirable aeration of such materials during the reducing treatment. The invention presents the advantages of large output in relation to size of apparatus, low cost of manufacture of the apparatus, and small space required for installment thereof; few wearing parts; inexpensive maintenance and renewal: small driving power required; slight attention; independence of the skill of the operator; easy inspection, cleanliness in operation and substantially no vibration.

What I claim as my invention and desire to secure by Letters Patent of the United States is:—

1. An apparatus for grinding or pulverizing food and similar products comprising in combination a stationary conical casing open at both ends, beaters or reducers, carried by the inner wall of said casing, a conical member within said casing leaving an annular channel between itself and the casing wall, outer beaters or reducers carried by said conical member and co-operating with those in the casing, a screw or propeller at the inlet end of the casing adapted to force the material towards and into engagement with the cooperating beaters or reducers of the casing and conical member, a forcing fan mounted outside the casing adjacent the inlet end thereof on the same shaft as the conical member, for impelling air through the annular channel and onto the material treated by the beaters or reducers therein, and a segmental covering ring at the discharge end of the casing, said ring cooperating with the beaters or reducers on the conical member and assisting the eduction or ejection of the treated material.

2. An apparatus for grinding or pulverizing food and similar products comprising in combination a stationary conical casing open at both ends, beaters or reducers carried by the inner wall of said casing, a conical member within said casing leaving an annular channel between itself and the casing wall, outer beaters or reducers carried by said conical member and cooperating with those in the casing, a screw or propeller at the inlet end of the casing adapted to force the material towards and into engagement with the cooperating beaters or reducers of the casing and conical member, a forcing fan mounted outside the casing adjacent the inlet end thereof on the same shaft as the conical member for impelling air through the annular channel and onto the material treated by the beaters or reducers therein and a segmental covering ring at the discharge end of the casing, said ring cooperating with the beaters or reducers on the conical member and assisting the eduction or ejection of the treated material, a casing at the inlet end of the apparatus, for containing the aforesaid fan, and means for regulating the quantity of air admitted to said casing and to the fan therein.

3. An apparatus of the character described comprising a casing, inwardly extending circumferentially spaced segmental members detachably connected to the interior of the casing, a rotatable member mounted in the casing, beaters carried by the rotatable member and cooperating with the segmental members of the casing for reducing material fed to the casing and conveying the same through the casing, means for feeding the material to the casing, and means for rotating the rotatable member.

4. An apparatus of the character described comprising a casing, inwardly extending longitudinally and circumferentially spaced segmental members detachably connected to the interior of the casing, a rotatable member mounted in the casing, beaters carried by the rotatable member, said beaters operating between the longitudinally spaced segmental members and cooperating with the segmental members of the casing for reducing material fed to the casing and conveying the same through the casing, means for feeding the material to the casing and means for rotating the rotatable member.

In witness whereof I have signed this specification in the presence of two witnesses.

RONALD HEAD.

Witnesses:
I. A. MELHURST,
A. MORRILL.